(12) United States Patent
Qiu et al.

(10) Patent No.: US 12,504,551 B1
(45) Date of Patent: Dec. 23, 2025

(54) SPATIAL ENCODING CRYSTAL ARRAY, DETECTOR, METHOD, APPARATUS, AND STORAGE MEDIUM

(71) Applicant: RAYCAN TECHNOLOGY CO., LTD. (SUZHOU), Suzhou (CN)

(72) Inventors: Ao Qiu, Suzhou (CN); Qingguo Xie, Suzhou (CN); Yiqing Ling, Suzhou (CN); Daoming Xi, Suzhou (CN)

(73) Assignee: RAYCAN TECHNOLOGY CO., LTD. (CN)

( * ) Notice: Subject to any disclaimer, the term of this patent is extended or adjusted under 35 U.S.C. 154(b) by 192 days.

(21) Appl. No.: 18/574,842

(22) PCT Filed: Dec. 6, 2022

(86) PCT No.: PCT/CN2022/136851
§ 371 (c)(1),
(2) Date: Dec. 28, 2023

(87) PCT Pub. No.: WO2023/197625
PCT Pub. Date: Oct. 19, 2023

(30) Foreign Application Priority Data

Apr. 11, 2022 (CN) .......................... 202210372867.4

(51) Int. Cl.
*G01T 1/202* (2006.01)
*G01T 1/208* (2006.01)

(52) U.S. Cl.
CPC .............. *G01T 1/202* (2013.01); *G01T 1/208* (2013.01)

(58) Field of Classification Search
CPC .................................. G01T 1/202; G01T 1/208
See application file for complete search history.

(56) References Cited

U.S. PATENT DOCUMENTS

2010/0012846 A1    1/2010   Wang

FOREIGN PATENT DOCUMENTS

| CN | 101772714 A | 7/2010 |
| CN | 101806912 A | 8/2010 |

(Continued)

OTHER PUBLICATIONS

Murayama et al., "Depth Encoding Multicrystal Detectors for PET," IEEE Transactions on Nuclear Science, vol. 45, No. 3, pp. 1152-1157. (Year: 1998).*

*Primary Examiner* — Kiho Kim
(74) *Attorney, Agent, or Firm* — Endurance Law Group PLC

(57) ABSTRACT

A spatial encoding crystal array, a spatial encoding detector, a spatial encoding method, a spatial encoding apparatus, and a storage medium are provided. The spatial encoding crystal array comprises: a plurality of scintillation crystal strips (10) and isolation layers (20), wherein the isolation layers (20) are arranged in a depth direction of the scintillation crystal strips (10) and are located between adjacent scintillation crystal strips (10); and the spatial distribution of the isolation layers (20) satisfies a predetermined spatial encoding function, and the properties of the isolation layers (20) conform to predetermined spatial encoding properties. The isolation layers (20) for spatial encoding are formed in different areas between the scintillation crystal strips (10), so as to form incomplete optical isolation, thereby saving on spatial distribution information of visible-light photons, and accurately obtaining three-dimensional spatial position information of high-energy photons.

32 Claims, 6 Drawing Sheets

(56) References Cited

FOREIGN PATENT DOCUMENTS

| | | | |
|---|---|---|---|
| CN | 101839992 | A | 11/2013 |
| CN | 107121692 | A | 7/2019 |
| CN | 111366969 | A | 7/2020 |
| CN | 114910946 | A | 8/2022 |
| JP | 2006227024 | A | 8/2006 |

\* cited by examiner

SPATIAL ENCODING CRYSTAL ARRAY, DETECTOR, METHOD, APPARATUS, AND STORAGE MEDIUM

CROSS REFERENCE TO RELATED APPLICATIONS

This application claims the priority of Chinese patent application 202210372867.4 filed on Apr. 11, 2022, the contents of which are all hereby incorporated by reference.

FIELD OF THE INVENTION

This application relates to the field of high-energy photon detection, and in particular relates to a spatial encoding crystal array, a spatial encoding detector, a spatial encoding method, spatial encoding apparatus, a spatial encoding electronic device, and a storage medium.

BACKGROUND OF THE INVENTION

High-energy photons generally refer to photons with energies not lower than 100 eV, including X-rays, γ-rays, α-particles, β-particles, and protons, and etc. The ability of high-energy photon detector to distinguish high-energy photon energy information, time information, and spatial information directly determines the imaging quality of the detection system. The working principle of the high-energy photon detector is as follows: firstly, the high-energy photon interacts with scintillation crystals to convert the high-energy photon into visible-light photons, and the visible-light photon is incident to photoelectric conversion device coupled to the scintillation crystal. The photoelectric conversion device converts the incident visible-light into an electrical signal, which is output and collected as a digital signal by using an electronic system matched with the photoelectric conversion device. Then, by using software algorithms, the time, energy, position and other information of the high-energy photon can be calculated from the digital signal.

Based on the time performance requirements of the detection system, the currently applied high-energy photon detectors usually take scintillation crystals and photoelectric conversion devices as their basic structures, wherein the scintillation crystals comprise LYSO, BGO, YSO, and the photoelectric conversion devices comprise bit-sensitive PMT, SiPM, SPAD.

At present, common high-energy photon detectors comprise the following types of structures: the first type is a single-layer scintillation crystal array structure, which consists of multiple crystal strips to form a scintillation crystal array, with reflective materials used to establish optical isolation between the crystal strips and between the sides of the crystal strips and the outside; and the optical surface at one end of each crystal strip are not covered with reflective materials, and instead they are coupled to the photoelectric conversion device array via coupling medium. The second type is the single-layer scintillation crystal array+ light guide layer structure, which adds a layer of light guide transparent to visible-light photons between the scintillation crystal array and the photoelectric conversion device array, and the visible-light photons are shot out of the scintillation crystal and then shot into the photoelectric conversion device array after a dispersion process. The third type is a continuous scintillation crystal structure, which consists of a whole piece of continuous scintillation crystal as a scintillator, and the scintillation crystal and the outside are optically isolated by using reflective material, and the optical surface of a section of the scintillation crystal is not covered with reflective material, and is coupled to the photoelectric conversion device array via coupling medium.

As for the single-layer scintillation crystal array structure, its spatial resolution is limited by the size of the scintillation crystals of the single-layer array and the photoelectric conversion device, and it is not able to obtain the two-dimensional spatial distribution of photons and is not able to obtain the three-dimensional spatial position information of a high-energy photon.

As for the continuous scintillation crystal structure, its edge effect is rather serious, which thus limits the size of the crystal and at the same time brings difficulties in detector calibration.

The contents of the background are only intended to facilitate understanding of the relevant technology in the field and are not to be regarded as an acknowledgement of the prior art.

SUMMARY OF THE INVENTION

The present application proposes a spatial encoding crystal array, a spatial encoding detector, a spatial encoding method, spatial encoding apparatus, a spatial encoding electronic device, and a storage medium to solve at least one of the above problems.

According to one aspect of the present application, a spatial encoding crystal array is proposed, wherein the spatial encoding crystal array comprises: a plurality of scintillation crystal strips and isolation layers, wherein the isolation layers are arranged in a depth direction of the scintillation crystal strips and are located between adjacent scintillation crystal strips; and the spatial distribution of the isolation layers conforms to a predetermined spatial encoding function, and properties of the isolation layers conform to predetermined spatial encoding properties.

According to some embodiments, the spatial encoding function is a three-dimensional spatial function, and function value of the three-dimensional spatial function varies monotonically or does not vary in the depth direction.

According to some embodiments, the spatial encoding function divides the spatial encoding crystal array into a number of regions along the depth direction, wherein the isolation layers are spaced apart in each the region.

According to some embodiments, the isolation layer comprises isolation bands and transparent bands, and the spatial encoding function meets the following conditions: the isolation bands and the transparent bands in each the region are of the same height along the depth direction, and spacing depths between the isolation bands or between the transparent bands in different the regions are not completely the same.

According to some embodiments, the isolation bands are made of a completely opaque material and the transparent bands are made of a transparent material.

According to some embodiments, the completely opaque material comprises an ESR (Enhanced Specular Reflector), a polyester film, a metal reflective film, a titanium monoxide coating and/or a barium sulphate coating.

According to some embodiments, the transparent material comprises air, an optical coupling medium, inorganic glass and/or organic glass.

According to some embodiments, the isolation layer comprises a plurality of first isolation bands and second isolation bands which are both spaced apart.

According to some embodiments, spacing depths between the first isolation bands and between the second isolation bands in each the region are the same, and spacing depths between the first isolation bands and between the second isolation bands in different the regions are not completely the same.

According to some embodiments, the first isolation band and the second isolation band are different in their refractive indexes.

According to some embodiments, the spatial encoding function does not vary or varies monotonically mathematically in a projection plane.

According to some embodiments, the spatial encoding properties comprise one or more of reflectivity, absorptance, transmittance, and refractive index.

According to some embodiments, the spatial encoding function divides the detector into a number of regions along the depth direction, wherein the spatial encoding properties of the isolation layer are not identical in different regions.

According to some embodiments, the scintillation crystal array is formed by laser inner carving of a continuous scintillation crystal.

According to some embodiments, the predetermined spatial encoding properties are realized by coating optical coupling media or transparent materials with different refractive indexes as the isolation layer between adjacent scintillation crystal strips in different regions.

According to some embodiments, the spatial encoding crystal array comprises a plurality of scintillation crystal strips arranged in row and column directions of a matrix, wherein the scintillation crystal strip in each row or column corresponds to one or more scintillation crystal strips in adjacent rows or columns.

According to an aspect of the present application, a spatial encoding detector is provided, wherein the spatial encoding detector comprises a spatial encoding crystal array above and a photoelectric conversion device array coupled to the spatial encoding crystal array.

According to some embodiments, the photoelectric conversion device array is configured to acquire a two-dimensional spatial distribution of incident visible-light photons on a projection plane.

According to some embodiments, the photoelectric conversion device array is coupled at one or both ends of the spatial encoding crystal array in the depth direction.

According to some embodiments, the photoelectric conversion device array and the spatial encoding crystal array are coupled via a light guide.

According to an aspect of the present application, a spatial encoding method is provided, wherein the spatial encoding method comprises: determining a spatial encoding function for isolation layer regions between different scintillation crystal strips in a detector; determining spatial encoding properties of the isolation layer regions based on the spatial encoding function so that different isolation layer regions are different in spatial encoding properties; changing the shapes and properties of different isolation layer regions according to the spatial encoding function and the spatial encoding properties to complete spatial encoding of the detector.

According to some embodiments, determining a spatial encoding function for isolation layer regions between different scintillation crystal strips in a detector comprises: determining spacing depths between the isolation layer regions by using a predetermined three-dimensional spatial function, wherein a value of the three-dimensional spatial function varies monotonically or does not vary in the depth of the scintillation crystal strips.

According to some embodiments, determining a spatial encoding function for isolation layer regions between different scintillation crystal strips in a detector comprises: employing an opaque material as an isolation layer between adjacent scintillation crystal strips in different the isolation layer regions, and employing a transparent material as an isolation layer in regions between the adjacent scintillation crystal strips that are not covered with an opaque material, wherein spacing between pieces of the opaque material and spacing between pieces of the transparent material satisfy the spatial encoding function.

According to some embodiments, the opaque material comprises an ESR (Enhanced Specular Reflector), a polyester film, a metal reflective film, a titanium monoxide coating and/or a barium sulphate coating.

According to some embodiments, the transparent material comprises air, an optical coupling medium, inorganic glass and/or organic glass.

According to some embodiments, determining spatial encoding properties of the isolation layer regions comprises: covering different isolation layer regions with transparent materials of different refractive indexes as an isolation layer between adjacent scintillating crystal strips so that different isolation layer regions are different in refractive indexes.

According to some embodiments, determining spatial encoding properties of the isolation layer regions comprises: taking an optical coupling medium or a transparent material as an isolation layer between adjacent scintillation crystal strips so that refractive indexes of different isolation layer regions satisfy the spatial encoding function.

According to some embodiments, the spatial encoding function is achieved by inner carving a continuous scintillation crystal by using laser, so that spatial encoding properties and/or properties of different isolation layer regions are different.

According to some embodiments, inner carving a continuous scintillation crystal by using laser, comprising: setting different laser parameters for different isolation layer regions so that refractive indexes of the isolation layer regions are the same as determined refractive indexes and refractive indexes of different isolation layer regions are different.

According to some embodiments, the laser parameter comprises a laser irradiation power, a laser irradiation time, a laser wavelength and/or a laser lattice density.

According to some embodiments, the shape of different isolation layer regions comprises a polygonal array or a circular array.

According to an aspect of the present application, a spatial encoding apparatus is provided, wherein the spatial encoding apparatus comprises: an encoding function determining unit for determining isolation layer regions to be encoded in the detector and a spatial encoding function of the isolation layer regions; an encoding property determining unit for determining spatial encoding properties of the isolation layer regions so that different isolation layer regions are different in spatial encoding properties; an encoding realization unit for changing the shapes and/or encoding properties of the isolation layer regions according to the spatial encoding function and the spatial encoding properties to complete spatial encoding of the detector.

According to an aspect of the present application, a spatial decoding method is provided for a detector above, wherein the method comprises: calculating a statistic corresponding to a deposition position of a high-energy photon; and determining the deposition position of the high-energy photon based on a pre-established corresponding relation table of spatial codes.

According to some embodiments, the statistic comprises parameters of a two-dimensional Gaussian function obtained by fitting, an average position, an average distance from the average position, a row kurtosis coefficient, a row skewness coefficient, a column kurtosis coefficient and/or a column skewness coefficient.

According to some embodiments, the corresponding relation table is obtained by using Monte Carlo simulation calculations and/or pre-determined experiments.

According to an aspect of the present application, a spatial decoding method is provided for a detector, wherein the method comprises: obtaining pulse signals output by a photoelectric conversion device array; calculating energy of various channels of the photoelectric conversion device array; calculating kurtosis coefficients and skewness coefficients for rows and columns of the photoelectric conversion device array; looking up a deposited position coordinate based on a pre-established look-up table.

According to some embodiments, the statistic comprises parameters of a two-dimensional Gaussian function obtained by fitting, an average position, an average distance from the average position, a row kurtosis coefficient, a row skewness coefficient, a column kurtosis coefficient and/or a column skewness coefficient.

According to some embodiments, the look-up table is obtained by using Monte Carlo simulation calculations and/or pre-determined experiments.

According to an aspect of the present application, an electronic device is provided, wherein the electronic device comprises: one or more processors; a storage device for storing one or more programs; when the one or more programs are executed by the one or more processors, the one or more processors implement the spatial encoding method or the spatial decoding method above.

According to an aspect of the present application, a storage medium, is provided, wherein the storage medium stores computer program instructions, and when the computer program instructions are executed by a processor, the processor implements the spatial encoding method or the spatial decoding method above.

According to some example embodiments of the present application, by forming spatial encoding isolation layers in different regions between scintillating crystal strips, thereby forming incomplete optical isolation, it is possible to preserve spatial distribution information of visible-light photons. Since the spatial distribution information of the visible-light photons is correlated with the deposition depth and the projection position information of the high-energy photon, it is thus possible to obtain the high-energy photon's three-dimensional spatial position information from the electrical signals output from the photoelectric conversion devices. In addition, the present application is characterized by low cost and simple hardware implementation.

Optional features and other effects of the embodiments of the present application are partly described below, and partly can be understood by reading this document.

BRIEF DESCRIPTION OF THE DRAWINGS

In order to illustrate the technical solutions in the embodiments of the present application more clearly, the drawings to be used in the description of the embodiments are briefly described below.

DESCRIPTION OF THE ENABLING EMBODIMENT

Figure 1:
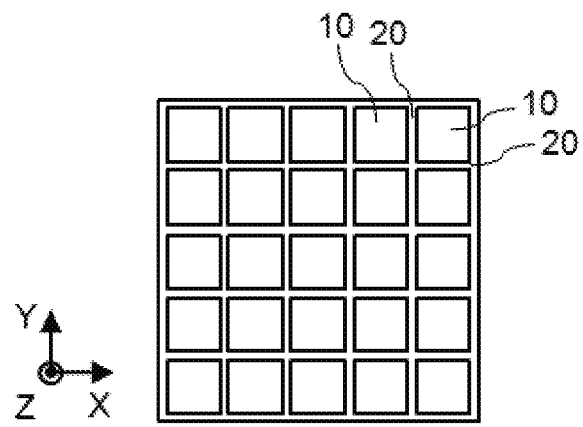
FIG. 1 illustrates a top view of a spatial encoding detector according to an example embodiment of the present application.

Example embodiments are now described more fully with reference to the drawings. However, the example embodiments are capable of being implemented in a variety of forms and should not be understood as being limited to the embodiments set forth herein. Instead, the provision of these embodiments allows the present application to be comprehensive and complete and conveys the idea of the example embodiments in a comprehensive manner to the person skilled in the art. Identical reference numbers in the drawings denote identical or similar parts, and thus repetitive descriptions of them are omitted.

The features, structures or characteristics described may be combined in one or more embodiments in any suitable manner. In the following description, many specific details are provided thereby giving a full understanding of the embodiments of the present disclosure. However, the person skilled in the art will realize that it is possible to practice the technical solutions of the present disclosure without one or more of these specific details, or by using other means, components, materials, devices or operations, etc. In these cases, the common structures, methods, devices, implementations, materials, or operations will not be shown or described in detail.

The flowcharts shown in the drawings are merely exemplary illustrations. It is not necessary to comprise all of the contents and operations/steps, it is not necessary to perform in the order described either. For example, some operations/steps may also be decomposed, while others may be combined or partially combined, so that the actual order of execution may change depending on the actual situation.

The terms "first", "second", etc. in the specification and the claims of the present application and the drawings above are used to distinguish between different objects and are not used to describe a particular order. In addition, the terms "comprise" and "have" and any variations thereof are intended to cover non-exclusive inclusion. For example, a process, a method, a system, a product or apparatus comprising a series of steps or units is not limited to the listed steps or units, but optionally also comprises steps or units that are not listed, or optionally comprises other steps or units that are inherent to the process, the method, the product or apparatus.

Specific embodiments according to the present application will be described in detail below with reference to the drawings.

FIG. 1 illustrates a top view of a spatial encoding detector according to an example embodiment of the present application, which comprises a scintillation crystal array and a photoelectric conversion device array coupled to the scintillation crystal array. As shown in FIG. 1, the scintillation crystal array comprises scintillation crystal strips 10 in a rows and b columns, wherein a, b are natural numbers greater than or equal to 1, but a, b are not both 1. Between two adjacent scintillation crystal strips 10, an optical material conforming to the spatial encoding function and having the spatial encoding properties is provided in accordance with the example embodiment of the present application to form an isolation layer 20, so that visible-light photons generated by the deposition of a high-energy photon in the scintillation crystal array are no longer limited to a single scintillation crystal strip, but are diffused into a plurality of scintillation crystal strips, thereby preserving the spatial distribution information of the visible-light photons.

It should be noted by the person skilled in the art that in the embodiment of FIG. 1, the smaller the actual thickness of the isolation layer 20 is, the more advantageous it is for improving the performance of the detector. The specific thickness of the isolation layer 20 can be determined according to different process requirements, and under known process conditions, the thickness of the isolation layer 20 can be achieved to be almost invisible to the naked eye, and the embodiment in FIG. 1 is only intended to be used as an example rather than a limitation.

Under the coordinate system shown in FIG. 1, wherein the z-axis direction is the depth direction of the scintillation crystals, and the x-axis and y-axis directions are the arrangement directions of the rows and columns of the scintillation crystal strips 10. For the convenience of the subsequent description, the plane at z=0 is assumed to be the intersection interface between the scintillation crystal array and the photoelectric conversion device array. If a light guide is provided between the scintillation crystal array and the photoelectric conversion device array, the plane at z=0 is assumed to be the intersection interface between the scintillation crystal array and the light guide.

Figure 2:
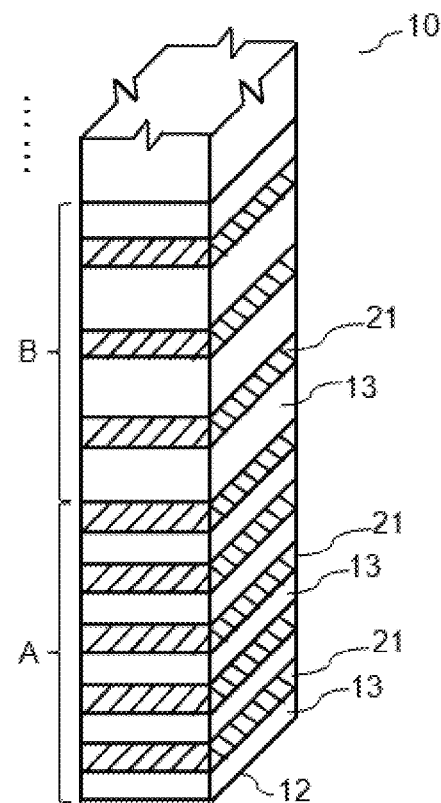
FIG. 2 illustrates a partial schematic view of spatial encoding of a single scintillation crystal strip in a detector according to an example embodiment of the present application.

FIG. 2 illustrates a partial schematic view of spatial encoding of a single scintillation crystal strip 10 in a detector according to the example embodiment of FIG. 1. The spatial encoding structure of a detector according to an example embodiment of the present application is described in detail below in combination with FIG. 2.

In the embodiment of FIG. 2, a single scintillation crystal strip 10 has a top end (not shown in the figure) and a bottom end 12 oppositely arranged. The plane where the bottom end 12 is located is the plane at z=0, and the outer surface of the scintillation crystal strip 10 is divided into a number of regions A, B, . . . in the same or different lengths along the z direction, wherein the lengths are the distances along the z-axis direction. In each region, isolation layers 20 are provided on the outer surfaces of the scintillation crystal strip 10 in accordance with a predetermined spatial encoding function.

For example, in the embodiment of FIG. 2, region A is a region of 0<z<1 mm, isolation bands 21 of 0.1 mm in width are provided at intervals of 0.1 mm in region A, and the region between each two adjacent isolation bands 21 is a transparent band 13; region B is a region of 1 mm<z<2 mm, isolation bands 21 of 0.1 mm in width are provided at intervals of 0.2 mm in region B, and the region between each two adjacent isolation bands 21 is a transparent band 13, and so on, so that the respective spacing between the opaque isolation bands and between the transparent bands satisfies the spatial encoding function, and the isolation bands 21 are provided in accordance with this spatial encoding function in the portion not shown in FIG. 2. It should be noted that, on any lateral surface of the scintillation crystal strip 10, a separate transparent band 13 and a separate isolation band 21 are both in the shape of a rectangle. The top surface of the scintillation crystal strip 10 may be optionally provided or not provided with the isolation band 21, while its bottom surface 12 is typically not provided with the isolation band 21 to facilitate the conduction of visible-light to the light guide or the photoelectric conversion device array.

After the isolation band 21 is provided according to the example of FIG. 2, a plurality of scintillation crystal strips 10 are arranged as shown in FIG. 1 to form the scintillation crystal array and the isolation layers 20, and the relevant process can be any process in the field that can achieve the arrangement and the distribution of the isolation layers, and we will not go into much detail here. The transparent band 13 may not be filled with any substance or may be filled with a transparent material that has essentially no effect on visible-light photon propagation, and we will not go into much detail here.

According to some embodiments of the present application, the isolation band 21 may block the visible-light photons inside the scintillation crystal strip 10, thereby preventing the visible-light photons from penetrating through the scintillation crystal strip 10 and entering into the adjacent scintillation crystal strips 10. For instance, the isolation band 21 may be selected from an ESR (Enhanced Specular Reflector), a polyester film, a metal reflective film, a titanium monoxide coating and/or a barium sulphate coating. Visible-light photons can only be transmitted to other scintillation crystal strips 10 via the transparent bands 13, wherein the transparent band 13 may be selected from inorganic glass, and organic glass.

It should be further noted that in the embodiment of FIG. 2, the predetermined spatial encoding function is preferably a three-dimensional spatial function, and the function value of the three-dimensional spatial function varies monotonically or does not vary in the depth direction of the scintillation crystals (that is, z-direction), so as to make the correlation between the statistic of the two-dimensional spatial distribution of the high-energy photon on the projection plane (i.e., the photosensitive plane of the photoelectric conversion device array) and the depth of the high-energy photon as obvious as possible, and the linearity degree as good as possible, thus making the depth resolution of the result finally restored as good as possible. Common statistic comprises the full-width at half-height, and kurtosis coefficient of digital signals collected by electronic systems. The three-dimensional spatial function describes the functional relationship between the statistic of the two-dimensional spatial distribution of the incident high-energy photon on the projection plane and its reaction depth, thereby determining the inverse function used to restore the deposition position.

According to some embodiments, the three-dimensional spatial function value does not vary or varies monotonically mathematically on the projection plane to make edge effect as weak as possible, that is, to make the relationship between the statistic describing the two-dimensional spatial distribution of the high-energy photon on the projection plane and the depth as unchanged as possible as the deposition position of the high-energy photon changes.

For example, the duty cycle is defined to be the depth of the isolation material covered in per unit depth of the isolation layer. Assuming that the depth of the scintillation crystal is 20 mm, that is, in the z-axis direction shown in FIG. 1, the depth is divided into 20 regions of isolation layers in 1 mm. The length of the opaque material covered in each isolation layer region is determined by the defined duty cycle three-dimensional spatial function, e.g., $L(x, y, z)=(20-z)/20$. From the example duty cycle three-dimensional spatial function, it can be seen that when a high-energy photon is deposited at the position where z is relatively large, because of the low duty cycle, the visible-light photons can be easily transported to the rest of the scintillation crystal, which makes the distribution of the incident light of the photoelectric conversion device on the projection plane more diffuse, wherein this distribution can be statistically assumed to satisfy the normal distribution.

It should be noted here that the duty cycle three-dimensional spatial function the can also be defined in the x-axis or y-axis direction, and we will not go into much detail here.

Figure 3:
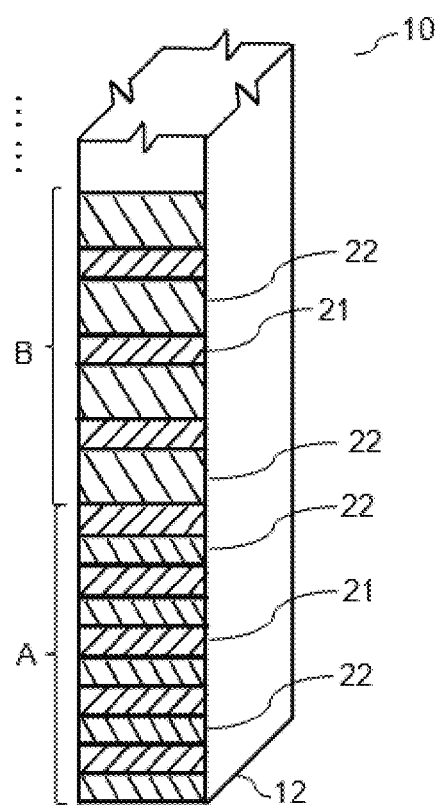
FIG. 3 illustrates a partial schematic view of another spatial encoding of a single scintillation crystal strip in a detector according to an example embodiment of the present application.

FIG. 3 illustrates a partial schematic view of another spatial encoding of a single scintillation crystal strip 10 in a detector according to the example embodiment of FIG. 1. The spatial encoding structure of a detector according to example embodiments of the present application is described in detail below in combination with FIG. 3, wherein compared with the embodiment of FIG. 2, the reference numbers in the embodiment of FIG. 3 for their same or similar components or portions are labeled by the addition of " ".

In the embodiment of FIG. 3, a single scintillation crystal strip 10' has a top end (not shown in the figure) and a bottom end 12' oppositely arranged. The plane where the bottom end 12' is located is the plane at z=0. The outer surface of the scintillation crystal strip 10' is divided into a number of regions A', B', . . . in the same or different lengths along the z direction. In each region, isolation layers 20 are provided on the outer surfaces of the scintillation crystal strip 10' in accordance with a predetermined distribution of functions. For example, in the embodiment of FIG. 3, the region A' is a region of 0<z<1 mm, and first isolation bands 21' and second isolation bands 22' are provided in the region A', wherein the first isolation bands 21' and the second isolation bands 22' are both 0.1 mm and are both spaced apart, and the first isolation band 21' and the second isolation band 22' are different in their refractive indexes to visible-light photons. Region B' is a region of 1 mm<z<2 mm, and the first isolation bands 21' and the second isolation bands 22' are also provided in region B', wherein the first isolation bands 21' are 0.1 mm and the second isolation bands 22' are 0.2 mm, the first isolation bands 21' and the second isolation bands 22' are both spaced apart, and each of the first isolation bands 21' and the second isolation bands 22' has the same refractive index to visible-light photons as that of the corresponding one in the region A', and so on, so that the first isolation band 21' and the second isolation band 22' are also provided according to the distribution of this function in the portion not shown in FIG. 3. It should be noted that on any lateral surface of the scintillation crystal strip 10, a separate first isolation band and a separate second isolation band are both in the shape of a rectangle. The top surface of the scintillation crystal strip 10 may optionally be provided or not provided with the isolation band, while its bottom surface 12 is typically not provided with isolation band to facilitate the conduction of visible-light to the light guide or the photoelectric conversion device array.

In the embodiment of FIG. 3, different portions of the isolation layer region possess different spatial encoding properties, such as refractive indexes, which enable visible photons generated by the interaction between a high-energy photon and the scintillation crystals to be diffused in the scintillation crystals, thereby preserving the spatial distribution information of the visible-light photons.

According to some example embodiments of the present application, the refractive index of the isolation layer region is determined using a predetermined three-dimensional spatial function, wherein the value of the three-dimensional spatial function preferably varies monotonically or does not vary in the depth direction of the scintillation crystals, so as to make the correlation between the statistic of the two-dimensional spatial distribution of the high-energy photon on the projection plane (i.e., the photosensitive plane of the photoelectric conversion device array) and the depth of the high-energy photon as obvious as possible, and the linearity degree as good as possible, thus making the depth resolution of the result finally restored as good as possible. Common statistic comprises the full-width at half-height and kurtosis coefficient of digital signals collected by electronic systems. The three-dimensional spatial function describes the functional relationship between the statistic of the two-dimensional spatial distribution of the incident high-energy photon on the projection plane and its reaction depth, thereby determining the inverse function used to restore the deposition position.

According to some embodiments, the three-dimensional spatial function value does not vary or varies monotonically mathematically on the projection plane to make edge effect as weak as possible, that is, to make the relationship between the statistic describing the two-dimensional spatial distribution of the high-energy photon on the projection plane and the depth as unchanged as possible as the deposition position of the high-energy photon changes.

According to other embodiments of the present application, as for detectors whose scintillation crystal is a continuous scintillation crystal, arrayed or other types of optical structures can be formed by irradiation to the continuous scintillation crystal by using a laser beam. The irradiation to continuous scintillation crystal by using the laser beam is also referred to as a laser inner carving of a continuous scintillation crystal.

According to some example embodiments of the present application, the laser inner carving of a continuous scintillation crystal may be utilized to lead to different refractive indexes in different portions within the isolation layer region. For example, a laser is utilized to irradiate a determined isolation layer region in accordance with a defined three-dimensional spatial function to produce an isolation layer region having different refractive indexes. The isolation layer regions may be in a polygonal array, such as a square array, or a circular array.

According to some embodiments, different laser parameters may be set for different isolation layer regions so that the refractive indexes of the isolation layer regions are the same as the determined refractive indexes and refractive indexes of different isolation layer regions are different. For example, in the z-axis direction shown in FIG. 4, that is, the depth direction of the scintillation crystal, the refractive index of the isolation layer is 1.0 in a region of 0 mm<z<1 mm, the refractive index of the isolation layer is 1.1 in a region of 1 mm<z<2 mm, and refractive indexes in other depth directions (such as the x-axis or the y-axis) may be analogous, and we will not go into much detail here. For another example, the refractive indexes of the isolation layer regions of the continuous scintillation crystal satisfy the three-dimensional spatial function L(x, y, z)=1+0.8×(20−z)/20, wherein the plane at z=0 is the interface between the scintillation crystal and the photoelectric conversion device.

According to some embodiments, the laser parameter comprises a laser irradiation power, a laser irradiation time, a laser wavelength, and/or a laser lattice density.

As for detectors whose scintillation crystals are a scintillation crystal array, according to some example embodiments of the present application, an optical coupling medium or a transparent material is used as an isolation layer between adjacent crystals in scintillation crystal array so that different portions of the isolation layer region are different in refractive indexes.

According to some embodiments, opaque materials, such as ESR (Enhanced Specular Reflector), polyester films, metal reflective films, titanium monoxide coatings, and/or barium sulfate coatings, are taken at different spacing lengths and covered to the same depth within different isolation layer regions to serve as isolation layers between adjacent crystals in the scintillation crystal array. And transparent materials, such as inorganic glass, organic glass, are used as the isolation layers to enable different refractive indexes for different isolation layer regions. For example, isolation layers of 0.1 mm are covered at intervals of 0.1 mm in a region of 0 mm<z<1 mm, isolation layers of 0.1 mm are covered at intervals of 0.2 mm in a region of 1 mm<z<2 mm, and so on.

According to the theory of electrodynamics, it is known that a high-energy photon can either be reflected or be transmitted at an interface with different refractive indexes on its both sides.

Taking LYSO crystal as an example, the refractive index of LYSO crystal is equal to about 1.8. Therefore, the proportion of visible-light photons entering into other scintillation crystal strips via the isolation layer is larger when z is larger, which represents that the distribution of the incident light of the photoelectric conversion device on the projection plane is more diffuse, wherein this distribution can be statistically assumed to conform to the normal distribution.

It should be noted here that the refractive index three-dimensional spatial function can also be defined in the x-axis or y-axis direction, and we will not go into much detail here.

According to the embodiment shown in FIG. 3, the spatial distribution information of the visible-light photons can be preserved by forming spatial encoding isolation layers in different regions between the scintillation crystal strips and thus forming incomplete optical isolation. Since the spatial distribution information of the visible-light photons is correlated with the deposition depth position and projection position information of the high-energy photon, and thus the correlation between the spatial distribution information of the visible-light photons and the deposition depth position and projection position information of the high-energy photon can be utilized to calculate the reaction depth, thereby determining the three-dimensional spatial position information of the high-energy photon. For example, the center of gravity method is utilized to calculate the position of the incident light on the projection plane, and the full-width at half-height method is utilized to calculate the reaction depth.

Figure 4:
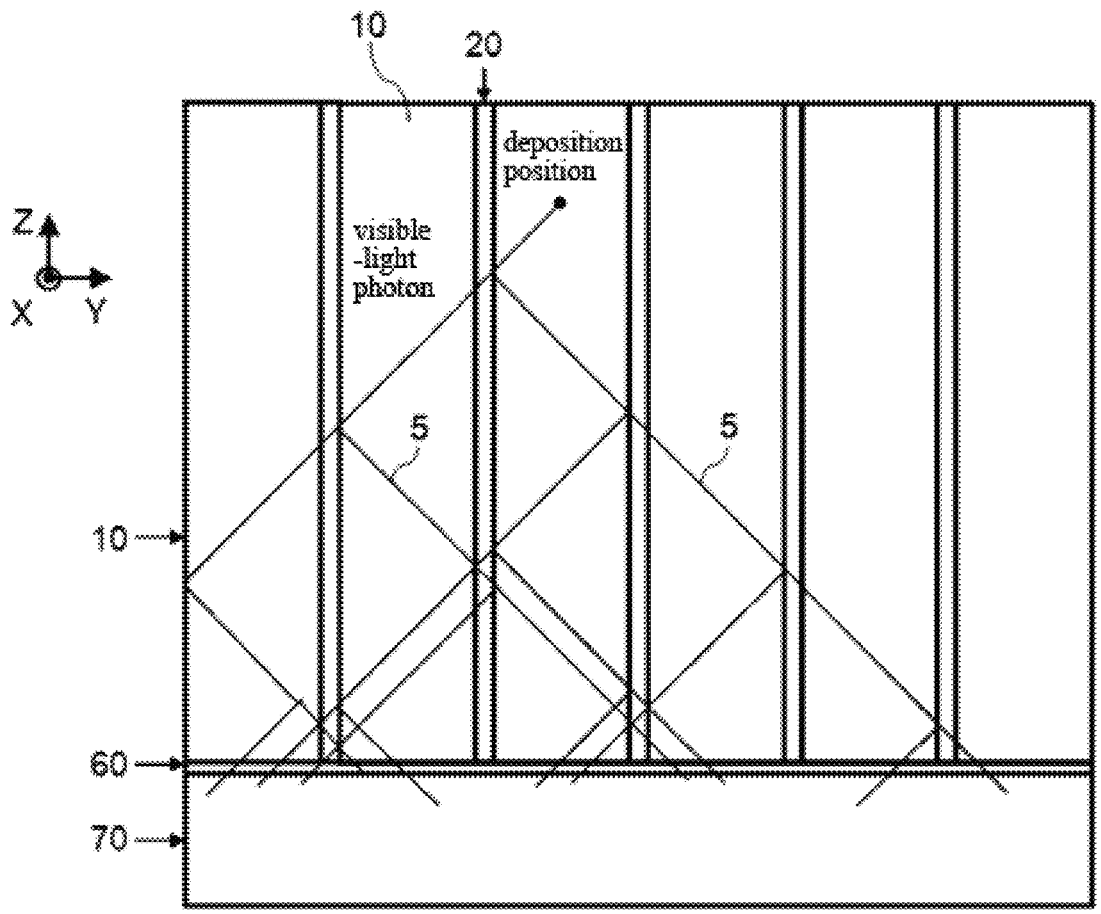
FIG. 4 illustrates a side view of diffusion of visible photons generated by deposition of a high-energy photon in a detector according to an example embodiment of the present application.

FIG. 4 illustrates a side view of diffusion of visible photons generated by a high-energy photon in a scintillation crystal according to an example embodiment of the present application. In the embodiment of FIG. 4, when a high-energy photon is deposited in the scintillation crystal strip 10 at the illustrated position, at the interface between the scintillation crystal strip 10 and the isolation layer 20, the visible-light photons partially pass through the isolation layer 20 into other scintillation crystal strips 10 and partially reflect to continue to propagate in the original scintillation crystal strip 10. Due to the higher deposition position, the visible-light photons undergo transmission and refraction more often and in a higher proportion, which represents a more diffuse distribution of the incident light of the photoelectric conversion device 70 on the projection plane 60, so that the deposition position of the high-energy photon can be inversely determined based on the light distribution on the projection plane 60.

It should be noted by the person skilled in the art that in the example embodiments of FIG. 1-FIG. 4, the scintillation crystal strip 10 is in the shape of a rectangle, but in the present application, the scintillation crystal strip 10 may also be in the shape of other prisms of varying edges, in the shape of a cylinder, or in other irregular shapes.

It should be noted by the person skilled in the art that in the above embodiments, the scintillation crystal strips 10 are arranged in row and column directions of a matrix, while in other embodiments, the scintillation crystal strips 10 may also be arranged in an irregular manner. That is, in the first type, a rectangular array of scintillation crystal strips of the same specification are arranged in an irregular manner, such as the scintillation crystal strips of the same specification are arranged in a staggered arrangement in the x or y direction with each other, and isolation or transparent bands on the lateral surface of the same scintillation crystal strip may correspond to two adjacent scintillation crystal strips in another row, so that the light transmitted through the isolation bands or the transparent bands can be incident on the two corresponding scintillation crystal strips. In the second type, rectangular scintillation crystal strips of different specifications are arranged in an irregular manner; for example, scintillation crystal strips of two different specifications are different in size and are staggered with each other in the x or y direction, and the isolation or transparent bands on the lateral surface of the relatively large scintillation crystal strip may correspond to the adjacent relatively small scintillation crystal strips in another row, so that the light transmitted through the isolation bands or transparent bands can be incident on the two corresponding scintillation crystal strips. In the third type, the scintillation crystal strips do not have exactly the same shape, and their arrangement is not completely regular; for example, one part of the scintillation crystal strips are in the shape of a prism, and the other part of them are in the shape of a cylinder, which are arranged in a staggered manner. According to the above arrangements and shapes, the corresponding spatial distribution information can be obtained in the projection plane likewise by corresponding spatial encoding of the isolation layer, and we will not go into much detail here.

Figure 5:
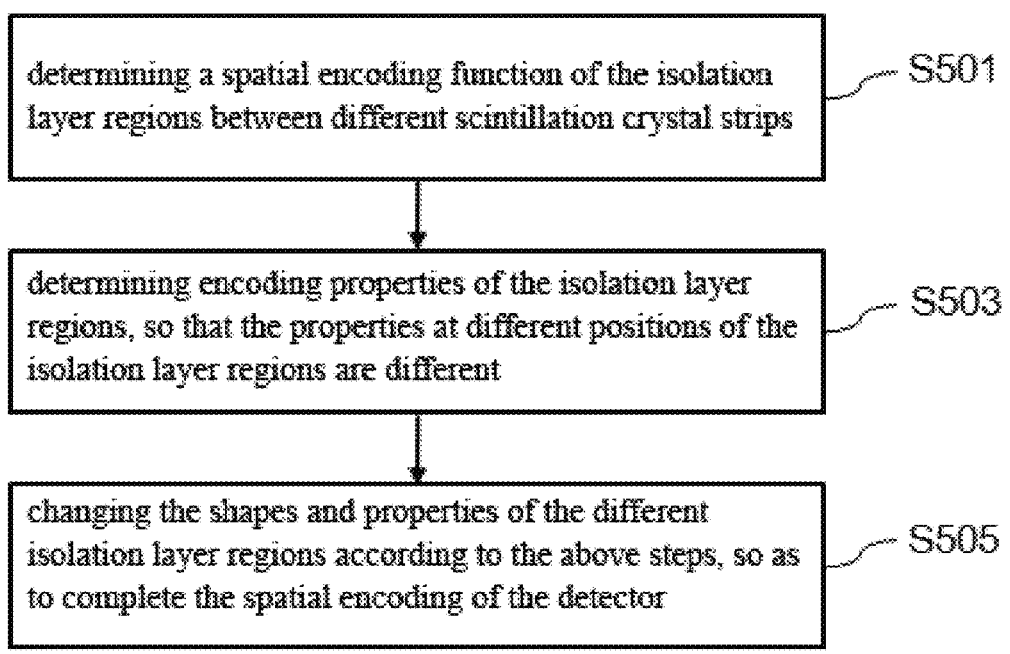
FIG. 5 illustrates a flowchart of a spatial encoding method of a detector according to an example embodiment of the present application.

FIG. 5 illustrates a flowchart of a spatial encoding method of a detector according to an example embodiment of the present application. The spatial encoding method of a detector according to an example embodiment of the present application is described in detail below in combination with FIG. 5.

At step S501, a spatial encoding function of the isolation layer regions between different scintillation crystal strips in the detector is determined, so as to facilitate a subsequent step of changing a transmission path of visible-light photons in the detector according to the determined spatial encoding function.

At step S503, encoding properties of the isolation layer regions are determined based on the spatial encoding function determined at step S501, so that the properties at different positions of the isolation layer regions are different, thereby facilitating the subsequent step of forming isolation layers with different properties at their different regions based on the determined encoded properties at the isolation layer regions, which enables the visible-light photons generated by the interaction between a high-energy photon and the scintillation crystals to be diffused in the scintillation crystals, thereby facilitating the detection of the spatial distribution information of the visible-light photons.

At step S505, according to the spatial encoding function determined in step S501 and the encoding properties determined in step S503, the shapes and properties of the different isolation layer regions are changed to make the shapes of the different isolation layer regions conform to the spatial encoding function and to make the properties of the different isolation layer regions conform to the determined encoding properties, so as to complete the spatial encoding of the detector.

According to some example embodiments of the present application, the spatial encoding function in the above step S501 may be a predetermined three-dimensional spatial function, wherein the value of the three-dimensional spatial function preferably varies monotonically or does not vary in the depth direction of the scintillation crystals, so as to make the correlation between the statistic of the two-dimensional spatial distribution of the high-energy photon on the projection plane (i.e., the photosensitive plane of the photoelectric conversion device array) and the depth of the high-energy photon as obvious as possible, and the linearity degree as good as possible, thus making the depth resolution of the result finally restored as good as possible. Common statistic comprises the full-width at half-height, and kurtosis coefficient of digital signals collected by electronic systems. The three-dimensional spatial function describes the functional relationship between the statistic of the two-dimensional spatial distribution of the incident high-energy photon on the projection plane and its reaction depth, thereby determining the inverse function used to restore the deposition projection position.

According to some embodiments of the present application, the three-dimensional spatial function value does not vary or varies monotonically mathematically on the projection plane in order to make the edge effects as weak as possible, that is, to make the relationship between the statistic describing the two-dimensional spatial distribution of the high-energy photon on the projection plane and the depth as unchanged as possible as projections of the deposition position of the high-energy photon changes.

For example, in the direction of the z-axis shown in FIG. 2, that is, in the depth direction of the scintillation crystal, isolation layers of 0.1 mm are covered intervals of 0.1 mm in a region of $0<z<1$ mm, and isolation layers of 0.1 mm are covered at intervals of 0.2 mm in a region of $1$ mm$<z<2$ mm, and so on.

According to some embodiments, according to a defined three-dimensional spatial function, different isolation layer regions are covered with opaque material of different depths, and other regions are covered with transparent material.

For example, the duty cycle is defined to be the depth of the isolation material covered in per unit depth of the isolation layer. Assuming that the depth of the scintillation crystal is 20 mm, that is, in the z-axis direction shown in FIG. 2, the depth is divided into 20 regions of isolation layers in 1 mm. The length of the opaque material covered in each isolation layer region is determined by the defined duty cycle three-dimensional spatial function, e.g., $L(x, y, z)=(20-z)/20$.

From the example duty cycle three-dimensional spatial function, it can be seen that when a high-energy photon is deposited at the position where z is relatively large, because of the low duty cycle, the visible-light photons can be easily transported to the other scintillation crystal strips of the detector, which makes the distribution of the incident light of the photoelectric conversion device on the projection plane more diffuse, wherein this distribution can be statistically assumed to satisfy the normal distribution.

It should be noted here that the three-dimensional spatial function can also be defined in the x-axis or y-axis direction, and we will not go into much detail here.

According to some embodiments of the present application, the encoding properties in the above step S503 may be one or more of reflectivity, absorptance, refractive index, and transmittance of the isolation layer region.

According to some embodiments of the present application, the reflectivity may be achieved by taking opaque material at different spacing depths and covered to the same depth in different isolation layer regions. For example, opaque materials such as ESR (Enhanced Specular Reflector), polyester films, metal reflective films, titanium monoxide coatings and/or a barium sulphate coatings, etc., are used as an isolation layer between adjacent crystal strips in the scintillation crystal array. Other contact areas between the adjacent crystal strips are covered with transparent materials, such as air, optical coupling media, inorganic glass, organic glass, as the isolation layer to enable different reflectivity in different isolation layer areas in step S503. It should be noted that in this embodiment, reflecting after covering the opaque material means that the visible-light is not able to penetrate the isolation layer region at all, or almost not able to penetrate the isolation layer region at all, such as more than 90% of the visible-light is reflected.

According to some example embodiments of the present application, the refractive index may be achieved by covering different isolation layer regions with transparent materials of different refractive indexes. For example, transparent materials including air, optical coupling media, inorganic glass, and/or organic glass, are used as an isolation layer between the adjacent scintillation crystals in the scintillation crystal array, so that the refractive indexes of the isolation layer regions are the same as the determined refractive indexes and different isolation layer regions are different in refractive indexes. In this embodiment, refraction means that most of the visible-light penetrates through the isolation layer region into the adjacent scintillation crystal strips, such as more than 90% of the visible-light is refracted. During refraction, a part of the light is usually reflected at the same time.

For example, The transparent materials are covered in a region of $0<z<1$ mm as an isolation layer between the adjacent scintillation crystal strips, so that the refractive index of the isolation layer is 1.0; and the transparent materials are covered in a region of $1$ mm$<z<2$ mm as an isolation layer between the adjacent scintillation crystal strips, so that the refractive index of the isolation layer is 1.1, and so on. Thus, the spatial encoding of the refractive index is accomplished.

According to some embodiments, the refractive indexes of the transparent materials covered in different isolation layer regions are different from those of the scintillation crystals. According to the theory of electrodynamics, it is known that a high-energy photon can either be reflected or be transmitted at an interface with different refractive indexes on its both sides.

According to some embodiments, the refractive index distribution of the different isolation layer regions may also satisfy a three-dimensional spatial function. For example, the refractive indexes of the isolation layer regions satisfy a three-dimensional spatial function $L(x, y, z)=1+0.8\times(20-z)/20$, wherein the plane at $z=0$ is the interface between the scintillation crystal and the photoelectric conversion device.

According to the theory of electrodynamics, it is known that a high-energy photon can either be reflected or be transmitted at an interface with different refractive indexes on its both sides. The larger the difference between the refractive indexes on the two sides, the higher the proportion of reflection.

Taking LYSO crystal as an example, the refractive index of LYSO crystal is equal to about 1.8. Therefore, the proportion of visible-light photons entering into other crystal strips via the isolation layer is larger when z is larger, which represents that the distribution of the incident light of the photoelectric conversion device on the projection plane is more diffuse, wherein this distribution can be statistically assumed to conform to the normal distribution.

It should be noted here that the refractive index three-dimensional spatial function can also be defined in the x-axis or y-axis direction, and we will not go into much detail here.

As for detectors whose scintillation crystal is a continuous scintillation crystal, arrayed or other types of optical structures can be formed by irradiation to the continuous scintillation crystal by using a laser beam. The irradiation to continuous scintillation crystal by using the laser beam is also referred to as a laser inner carving of a continuous scintillation crystal.

According to some example embodiments of the present application, according to the spatial encoding function determined in step S501 and the encoding properties of the isolation layer regions determined in step S503, the laser inner carving of a continuous scintillation crystal may be utilized so that the scintillation crystals and the isolation layers have the same shapes as those determined in step S501 and the encoding properties of the isolation layers are the same as the encoding properties determined in step S503.

According to some embodiments, a laser is utilized to irradiate the isolation layer region determined in step S501 in accordance with a defined three-dimensional spatial function to produce isolation layer regions having different refractive indexes. The isolation layer regions may be in a polygonal array, such as a square array, or a circular array.

According to some embodiments, different laser parameters are set for different isolation layer regions, so that the refractive indexes of the isolation layer regions are the same as the determined refractive indexes and refractive indexes of different isolation layer regions are different.

For example, in the z-axis direction shown in FIG. 2, that is, the depth direction of the scintillation crystal, the refractive index of the isolation layer is 1.0 in a region of $0<z<1$ mm, the refractive index of the isolation layer is 1.1 in a region of $1$ mm$<z<2$ mm, and refractive indexes in other depth directions such as the x-axis or the y-axis may be analogized, and we will not go into much detail here.

For another example, the refractive indexes of the isolation layer regions of the continuous scintillation crystal satisfy the three-dimensional spatial function $L(x, y, z)=1+0.8\times(20-z)/20$, wherein the plane at $z=0$ is the interface between the scintillation crystal and the photoelectric conversion device.

According to some embodiments, the laser parameter comprises a laser irradiation power, a laser irradiation time, a laser wavelength, and/or a laser lattice density.

According to some example embodiments of the present application, optical coupling media or transparent materials may also be utilized as isolation layers between adjacent strips of scintillation crystals in the scintillation crystal array so that the refractive indexes of the isolation layer regions determined at step S503 meets the requirements for spatial encoding.

According to the embodiment shown in FIG. 5, the spatial distribution information of the visible-light photons can be preserved by forming different refractive indexes in different isolation layer regions in the detector to form incomplete optical isolation. And the spatial distribution information of the visible-light photons is correlated with the deposition depth position and projection position information of the high-energy photon, and thus the correlation between the spatial distribution information of the visible-light photons and the deposition depth position and projection position information of the high-energy photon can be utilized to calculate the reaction depth, thereby determining the three-dimensional spatial position information of the high-energy photon. For example, the center of gravity method is utilized to calculate the position of the incident light on the projection plane, and the full-width at half-height method is utilized to calculate the reaction depth.

Figure 6:
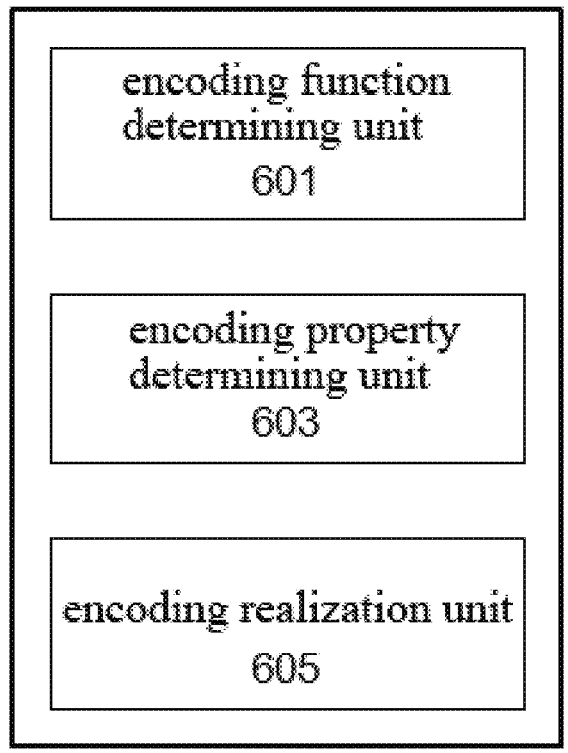
FIG. 6 illustrates a spatial encoding apparatus according to an example embodiment of the present application.

FIG. 6 illustrates a spatial encoding apparatus according to an example embodiment of the present application, wherein said spatial encoding apparatus comprises an encoding function determining unit 601, an encoding property determining unit 603, and an encoding realization unit 605, wherein the encoding function determining unit 601 is used to determine the isolation layer regions to be encoded in the detector and a spatial encoding function of the isolation layer regions; the encoding property determining unit 603 is used to determine encoding properties of the isolation layer regions so that the encoding properties of different isolation layer regions are different; the encoding realization unit 605 is used to change the shapes and/or encoding properties of the isolation layer regions according to the spatial encoding function and the encoding properties to make the shapes of the different isolation layer regions conform to the spatial encoding function and to make the properties of the different isolation layer regions conform to the determined encoding properties, so as to complete the spatial encoding of the detector.

Figure 7:
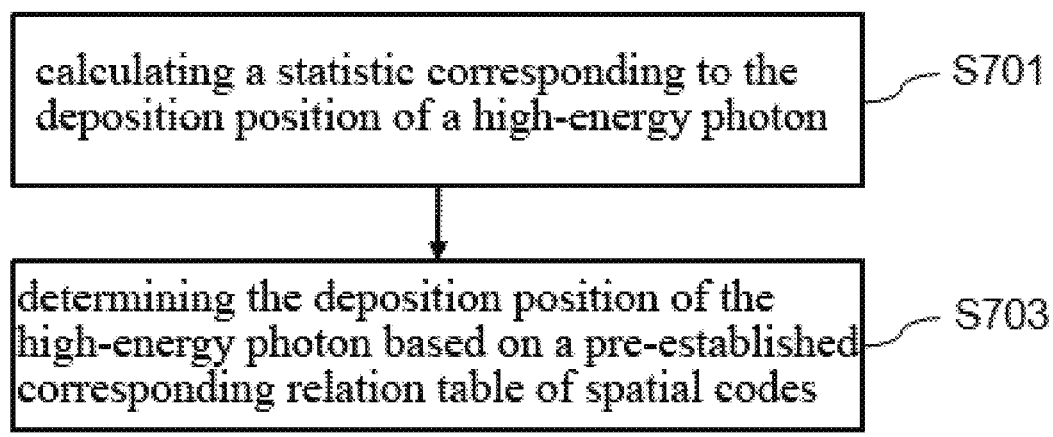
FIG. 7 illustrates a flowchart of a spatial encoding method according to an example embodiment of the present application.

FIG. 7 illustrates a flowchart of a spatial encoding method according to an example embodiment of the present application.

At step S701, a statistic corresponding to the deposition position of a high-energy photon is calculated.

According to some example embodiments of the present application, when the high-energy photons are deposited at different depths of the scintillation crystal strips, under the effect of the spatial encoding isolation layer, the distributions of the incident lights of the photoelectric conversion device on the projection plane are different, and the distributions can be statistically assumed to satisfy a normal distribution.

Therefore, a two-dimensional Gaussian function can be used to fit the energy of the various scintillation crystals on the scintillation crystal array. For example, a two-dimensional Gaussian function can be used to fit the normalized energy of the various scintillation crystals on the scintillation crystal array. The statistic corresponding to the deposition position of the high-energy photon calculated in step S701 is parameters of a two-dimensional Gaussian function corresponding to the normalized energy value of the various scintillation crystals.

At step S703, the deposition position of the high-energy photon is determined based on a pre-established corresponding relation table of spatial codes.

According to some embodiments, prior to performing step S703, it is also necessary to pre-establish a corresponding relation table of spatial codes, which comprises a relationship between a deposition position and a statistic. For example, Monte Carlo simulation is used to establish the relationship between the deposition coordinate (x, y, z) of the high-energy photon and the parameters of the two-dimensional Gaussian function. The deposition coordinate (x, y, z) of the high-energy photon are then determined based on the two-dimensional Gaussian function calculated at step S701 and the pre-established relation table between the deposition position and the parameters of the two-dimensional Gaussian function. It can also be obtained from experimental results under the predetermined condition that the deposition position of the high-energy photon is controlled, and we will not go into much detail here.

According to the embodiment shown in FIG. 7, based on the correlation between the spatial distribution information of the visible-light photons and the deposition depth information of the high-energy photon, it is realized to obtain the reaction depth information of the high-energy photon from the electrical signals output by the photoelectric conversion devices. Compared to existing solutions, the present embodiment has the characteristics of low cost and low hardware complexity.

Figure 8:
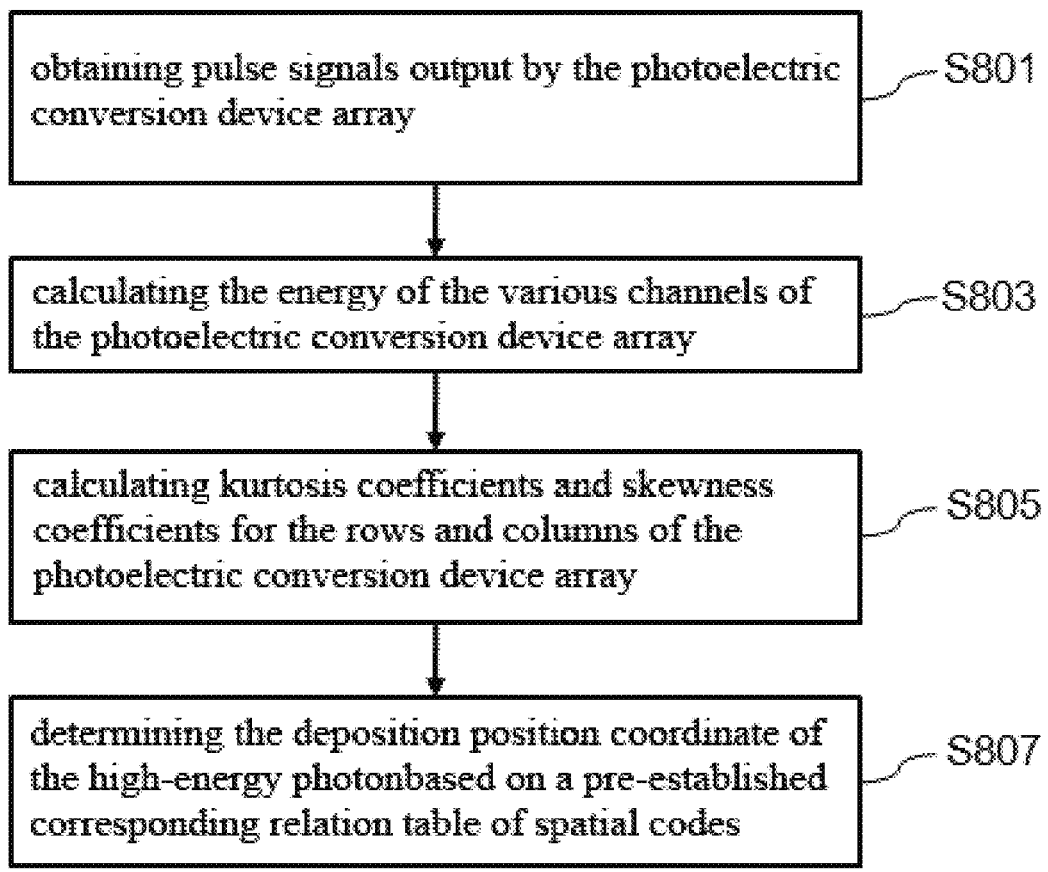
FIG. 8 illustrates a flowchart of another spatial encoding method according to an example embodiment of the present application.

FIG. 8 illustrates a flowchart of another spatial encoding method according to an example embodiment of the present application. Another spatial encoding method according to an example embodiment of the present application is described in detail below with respect to FIG. 8.

At step S801, pulse signals output by the photoelectric conversion device array are obtained.

According to some embodiments, the pulse signals output by the various channels of the photoelectric conversion device array may be digitalized by using multi-voltage threshold sampling or regular time sampling.

At step S803, the energy of the various channels of the photoelectric conversion device array is calculated.

According to some embodiments, based on the sampling point data of the pulse signals, integral values of the electrical signal pulses can be reconstructed by means of cumulative summation, integration after fitting, or establishing a look-up table, wherein the integral values contains the energy of the various channels, and the energy of the various channels of the photoelectric conversion devices can be reconstructed by means of linear correction, non-linear correction, or establishing a look-up table.

At step S805, kurtosis coefficients and skewness coefficients are calculated for the rows and columns of the photoelectric conversion device array.

According to some embodiments, before obtaining the kurtosis coefficients and skewness coefficients, it is necessary to first obtain the position coordinate (x1, y1) of the channel with the largest energy in the space based on the energy of the various channels. For example, by inputting the energy of the various channels and the spatial positions of the various channels, it can be obtained that the position of the channel with the largest energy among the various channels in the space is (x1, y1).

According to some embodiments, based on the energy of the various channels and the positions of the various channels in the space, the energy of the various channels in the same row is summed to obtain a total channel energy sequence for the various rows. Similarly, the total channel energy sequence for the various columns is obtained. By inputting the serial number and total energy of the various rows, the row kurtosis coefficient and row skewness coefficient can be calculated. Similarly, the column kurtosis coefficient and column skewness coefficient are calculated.

At step S807, the deposition position coordinate is looked up based on a pre-established look-up table.

According to some embodiments, a look-up table between the deposition positions (x, y, z) and (x1, y1), the average position, the average distance from the average position, the row kurtosis coefficient, the row skewness coefficient, the column kurtosis coefficient, the column skewness coefficient of the high-energy photon, is established by Monte Carlo simulation and/or experiment and by performing steps S801~S805.

At step S807, based on the established look-up table, the deposition position coordinate (x, y, z) of the high-energy photon is reconstructed based on (x1, y1), the row kurtosis coefficient, the row skewness coefficient, the column kurtosis coefficient, the column skewness coefficient, and the look-up table.

According to the embodiment shown in FIG. 8, based on correlation between the spatial distribution information of the visible-light photons and the deposition depth position and projection position information of the high-energy photon, it is achieved to obtain the reaction depth information of the high-energy photon from the pulse signals outputted from the photoelectric conversion devices. Compared to the existing solutions, the present embodiment has the characteristics of low cost and low hardware complexity.

Figure 9:
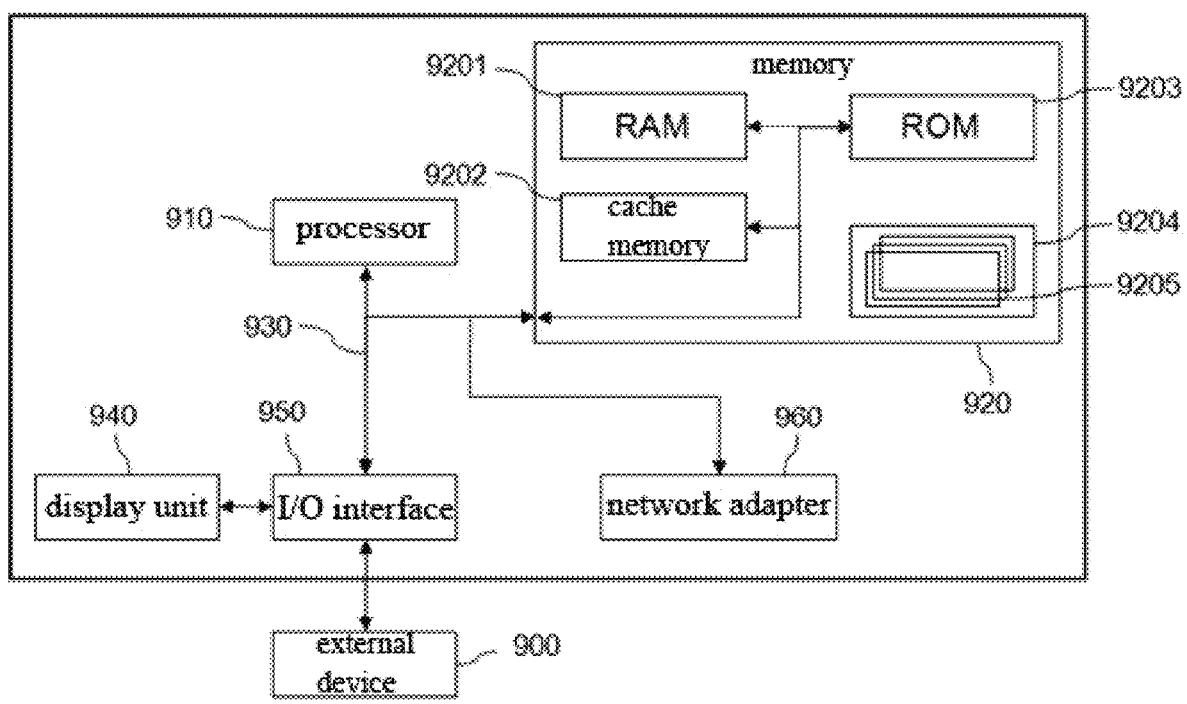
FIG. 9 illustrates an electronic device according to an example embodiment of the present application.

FIG. 9 illustrates a block diagram of an electronic device according to an embodiment of the present application. The electronic device illustrated in FIG. 9 is merely an example and should not impose any limitations on the functionality and scope of use of embodiments of the present application.

As shown in FIG. 9, the electronic device is represented in the form of a general-purpose computing device. Components of the electronic device may comprise but are not limited to: at least one processor 910, at least one memory 920, buses 930 connecting different system components including the memory 920 and the processor 910, a display unit 940, and the like. Wherein, the memory 920 stores program code, and the program code may be executed by the processor 910 so that the processor 910 executes the methods described herein according to various exemplary embodiments of the present application. For example, the processor 910 may execute a method as shown in FIG. 5, FIG. 7, or FIG. 8.

The memory 920 may comprise a readable medium in the form of a volatile memory unit, such as a random access memory unit (RAM) 9201 and/or a cache memory unit 9202, and may further comprise a read-only memory unit (ROM) 9203.

The memory 920 may also comprise a program/utility 9204 having a set of (at least one) program modules 9205, wherein such program modules 9205 include but are not limited to: an operating system, one or more applications, other program modules, and program data. Each of these examples, or some combination thereof, may include an implementation of a networked environment.

The buses 930 may be represented as one or more of several types of bus structures, which includes a memory cell bus or memory cell controller, a peripheral bus, a graphics acceleration port, a processing unit, or a local bus using any of a plurality of bus structures.

The electronic device may also communicate with one or more external devices 900 (e.g., keyboards, pointing devices, Bluetooth devices, etc.), communicate with one or more devices that enable a user to interact with the electronic device, and/or communicate with any device (e.g., routers, modems, etc.) that enables the electronic device to communicate with one or more other computing devices. Such communication may be carried out via an input/output (I/O) interface 950. Further, the electronic device may also communicate with one or more networks (e.g., a local area network (LAN), a wide area network (WAN), and/or a public network, such as the Internet) via the network adapter 960. The network adapter 960 may communicate with other modules of the electronic device via the buses 930. It should be appreciated that, although not shown in the figures, other hardware and/or software modules may be used in combination with the electronic device, wherein the hardware and/or software modules include but are not limited to: microcode, device drives, redundant processing units, external disk drive arrays, RAID systems, tape drives, and data backup storage systems, etc.

Based on the above description of the embodiments, it is easy for the skilled person in the art to understand that the example embodiments described herein may be implemented by means of software or by means of software in combination with the necessary hardware. The technical solution according to the embodiments of the present application may be embodied in the form of a software product that may be stored in a computer-readable storage medium (which may be a CD-ROM, a U disk, a removable hard disk, etc.) or on a network, and comprises a number of computer program instructions to cause a computing device (which may be a personal computer, a server, or a network device, etc.) to execute the above method according to the embodiment of the present application.

The software product may employ any combination of one or more readable media. The readable medium may be a readable signal medium or a readable storage medium. The readable storage medium, for example, may be but is not limited to a system, a device, or apparatus that is electrical, magnetic, optical, electromagnetic, infrared, or semiconducting, or any combination of the above. More specific examples of a readable storage medium (a non-exhaustive list) comprise: an electrical connector having one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

The computer readable storage medium may comprise a data signal carrying readable program code propagated in baseband or as part of a carrier wave. Such propagated data signal may take a variety of forms, which comprises but is not limited to an electromagnetic signal, an optical signal, or any suitable combination thereof. The readable storage medium may also be any readable medium other than a readable storage medium that sends, propagates, or transmits a program for use by or in conjunction with an instruction execution system, apparatus, or device. The program code contained on the readable storage medium may be transmitted by using any suitable medium which includes but is not limited to wireless, wired, optic fiber, RF, etc. or any suitable combination thereof.

The program code for performing the operations of the present application may be written in any combination of one or more programming languages, including object-oriented programming languages-such as Java, C++, etc., and conventional procedural programming languages-such as C or the like. The program code may be executed entirely on the user computing device, executed partially on the user device, executed as an independent software package, executed partially on the user computing device and partially on the remote computing device, or executed entirely on the remote computing device or server. In the cases involving a remote computing device, the remote computing device may be connected to a user computing device via any kind of network, including a local area network (LAN) or a wide area network (WAN), or it may be connected to an external computing device (e.g., to connect via the Internet by using an Internet Service Provider).

The above computer-readable medium carries one or more program instructions, and when the one or more program instructions are executed by one of the devices, the computer-readable medium performs the foregoing functions.

A person skilled in the art may understand that the modules described above may be distributed in a device as described in the embodiment, or may be varied and be adopted in one or more devices different from those of the present embodiments. The plurality of modules of the above embodiments may be combined into a single module, or a module may be further split into a plurality of sub-modules.

Based on the above description of the embodiments, it is easy for the skilled person in the art to understand that the example embodiments described herein can be realized by means of software, or by means of software combined with the necessary hardware. The technical solution according to the embodiments of the present application may be embodied in the form of a software product that may be stored in a computer-readable storage medium (which may be a CD-ROM, a U disk, a mobile hard disk, etc.) or on a network, and comprises a number of computer program instructions to cause a computing device (which may be a personal computer, a server, or a network device, etc.) to execute the above method according to the embodiment of the present application.

The software product may utilize any combination of one or more readable media. The readable medium may be a readable signal medium or a readable storage medium. The readable storage medium, for example, may be but is not limited to a system, device, or apparatus that is electrical, magnetic, optical, electromagnetic, infrared, or semiconducting, or any combination of the above. More specific examples of a readable storage medium (a non-exhaustive list) comprise: an electrical connector having one or more wires, a portable disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

The computer-readable storage medium may comprise a data signal carrying readable program code propagated in baseband or as part of a carrier wave. Such propagated data signal may take a variety of forms, which comprises but is not limited to an electromagnetic signal, an optical signal, or any suitable combination thereof. The readable storage medium may also be any readable medium other than a readable storage medium that sends, propagates, or transmits a program for use by or in conjunction with an instruction execution system, apparatus, or device. The program code contained on the readable storage medium may be transmitted by using any suitable medium which includes but is not limited to wireless, wired, optic fiber, RF, etc., or any suitable combination thereof.

The program code for performing the operations of the present application may be written in any combination of one or more programming languages, including object-oriented programming languages-such as Java, C++, etc., and also conventional procedural programming languages-such as C or the like. The program code may be executed entirely on the user computing device, executed partially on the user device, executed as an independent software package, executed partially on the user computing device and partially on the remote computing device, or executed entirely on the remote computing device or server. In the cases involving a remote computing device, the remote computing device may be connected to the user computing device via any kind of network, including a local area network (LAN) or a wide area network (WAN), or it may be connected to an external computing device (e.g., to connect via the Internet by using an Internet Service Provider).

The above computer-readable medium carries one or more program instructions that, and when the above one or more program instructions are executed by one of the devices, the computer-readable medium performs the foregoing functions.

A person skilled in the art may understand that each of the above modules may be distributed in the device as described in the embodiments, or may be varied and be adopted in one or more devices different from those of the present embodiments. The plurality of modules of the above embodiments may be combined into a single module, or a module may be further split into a plurality of sub-modules.

According to some example embodiments of the present application, by spatially encoding the isolation layer in different regions in the detector to form an incomplete optical isolation, the spatial distribution information of the visible-light photons can be preserved. Since the spatial distribution information of the visible-light photons is correlated with the deposition depth and the projection position information of the high-energy photon, the reaction depth of the high-energy photon can thus be obtained from the signals outputted from the photoelectric conversion devices, so as to determine its three-dimensional spatial position information. And the present application is characterized by low cost and simple hardware implementation.

Although the present application provides method operation steps as described in the above embodiments or flowcharts, more or fewer operation steps may be included in the described method based on routine or non-creative labor. In the case of steps that do not logically have a necessary causal relationship, the order of execution of these steps is not limited to the order of execution provided by the embodiments of the present application.

The various embodiments in the present specification are described in a progressive manner, so that the same and similar parts between the various embodiments can refer to each other, and each embodiment focuses on the description of the differences with other embodiments.

The above embodiments of the present application are described in detail. Specific examples are applied herein to illustrate the principles and implementations of the present application, and the above illustrations of the embodiments are only used to help understand the methods of the present application and its core ideas. At the same time, the changes or deformations made by the skilled person in the art based on the ideas of the present application and the specific implementation and application scope of the present application are within the protection scope of the present application. In summary, the contents of the present specification shall not be construed as a limitation of this application.

What is claimed is:

1. A spatial encoding crystal array, which comprises:
   a plurality of scintillation crystal strips and isolation layers, wherein said isolation layers are arranged in a depth direction of said scintillation crystal strips and are located between adjacent scintillation crystal strips; and a spatial distribution of said isolation layers conforms to a predetermined spatial encoding function, and properties of said isolation layers conform to predetermined spatial encoding properties.

2. The spatial encoding crystal array according to claim 1, wherein said spatial encoding function is a three-dimensional spatial function, and function value of said three-dimensional spatial function varies monotonically or does not vary in said depth direction.

3. The spatial encoding crystal array according to claim 1, wherein said spatial encoding function divides said spatial encoding crystal array into a number of regions along said depth direction, wherein said isolation layers are spaced apart in each said region.

4. The spatial encoding crystal array according to claim 3, wherein said isolation layer comprises isolation bands and transparent bands, and said spatial encoding function meets the following conditions: said isolation bands and said transparent bands in each said region are of same height along said depth direction, and spacing depths between said isolation bands or between said transparent bands in different said regions are not completely same.

5. The spatial encoding crystal array according to claim 4, wherein said isolation bands are made of a completely opaque material and said transparent bands are made of a transparent material.

6. The spatial encoding crystal array according to claim 5, wherein said completely opaque material is selected from a group consisting of an ESR, a polyester film, a metal reflective film, a titanium monoxide coating and a barium sulphate coating.

7. The spatial encoding crystal array according to claim 5, wherein said transparent material is selected from a group consisting of air, an optical coupling medium, inorganic glass and organic glass.

8. The spatial encoding crystal array according to claim 3, wherein said isolation layer comprises a plurality of first isolation bands and second isolation bands which are both spaced apart.

9. The spatial encoding crystal array according to claim 8, wherein spacing depths between said first isolation bands and between said second isolation bands in each said region are same, and spacing depths between said first isolation bands and between said second isolation bands in different said regions are not completely same.

10. The spatial encoding crystal array according to claim 8, wherein said first isolation band and said second isolation band are different in their refractive indexes.

11. The spatial encoding crystal array according to claim 1, wherein said spatial encoding function does not vary or varies monotonically mathematically in a projection plane.

12. The spatial encoding crystal array according to claim 1, wherein said spatial encoding properties comprise one or more of reflectivity, absorptance, transmittance, and refractive index.

13. The spatial encoding crystal array according to claim 12, wherein said spatial encoding function divides said spatial encoding crystal array into a number of regions along said depth direction, wherein said spatial encoding properties of said isolation layer are not identical in different regions.

14. The spatial encoding crystal array according to claim 1, wherein said scintillation crystal array is formed by laser inner carving of a continuous scintillation crystal.

15. The spatial encoding crystal array according to claim 1, wherein said predetermined spatial encoding properties are realized by coating optical coupling media or transparent materials with different refractive indexes as said isolation layer between adjacent scintillation crystal strips in different regions.

16. The spatial encoding crystal array according to claim 1, wherein said spatial encoding crystal array comprises a plurality of scintillation crystal strips arranged in row and column directions of a matrix, wherein said scintillation crystal strip in each row or column corresponds to one or more scintillation crystal strips in adjacent rows or columns.

17. A spatial encoding device, which comprises a spatial encoding crystal array according to claim 1 and a photoelectric conversion device array coupled to said spatial encoding crystal array.

18. The spatial encoding device according to claim 17, wherein said photoelectric conversion device array is configured to acquire a two-dimensional spatial distribution of incident visible-light photons on a projection plane.

19. The spatial encoding device according to claim 17, wherein said photoelectric conversion device array is coupled at one or both ends of said spatial encoding crystal array in said depth direction.

20. The spatial encoding device according to claim 17, wherein said photoelectric conversion device array and said spatial encoding crystal array are coupled via a light guide.

21. A spatial encoding method, which comprises:
  determining a spatial encoding function for isolation layer regions between different scintillation crystal strips in a device;
  determining spatial encoding properties of said isolation layer regions based on said spatial encoding function so that different isolation layer regions are different in spatial encoding properties;
  changing the shapes and properties of different isolation layer regions according to said spatial encoding function and said spatial encoding properties to complete spatial encoding of said device.

22. The spatial encoding method according to claim 21, wherein determining a spatial encoding function for isolation layer regions between different scintillation crystal strips in a device comprises:
  determining spacing depths between said isolation layer regions by using a predetermined three-dimensional spatial function, wherein a value of said three-dimensional spatial function varies monotonically or does not vary in the depth of said scintillation crystal strips.

23. The spatial encoding method according to claim 21, wherein determining a spatial encoding function for isolation layer regions between different scintillation crystal strips in a device comprises:
  employing an opaque material as an isolation layer between adjacent scintillation crystal strips in different said isolation layer regions, and employing a transparent material as an isolation layer in regions between said adjacent scintillation crystal strips that are not covered with an opaque material, wherein spacing between pieces of said opaque material and spacing between pieces of said transparent material satisfy said spatial encoding function.

24. The spatial encoding method according to claim 23, wherein said opaque material is selected from a group consisting of an ESR, a polyester film, a metal reflective film, a titanium monoxide coating and a barium sulphate coating.

25. The spatial encoding method according to claim 23, wherein said transparent material is selected from a group consisting of air, an optical coupling medium, inorganic glass and organic glass.

26. The spatial encoding method according to claim 21, wherein determining spatial encoding properties of said isolation layer regions comprises:
  covering different isolation layer regions with transparent materials of different refractive indexes as an isolation layer between adjacent scintillation crystal strips so that different isolation layer regions are different in refractive indexes.

27. The spatial encoding method according to claim 21, wherein determining spatial encoding properties of said isolation layer regions comprises:
  taking an optical coupling medium or a transparent material as an isolation layer between adjacent scintillation crystal strips so that refractive indexes of different isolation layer regions satisfy said spatial encoding function.

28. The spatial encoding method according to claim 21, wherein said spatial encoding function is achieved by inner carving a continuous scintillation crystal by using laser, so that spatial encoding properties and/or properties of different isolation layer regions are different.

29. The spatial encoding method according to claim 28, wherein inner carving a continuous scintillation crystal by using laser, comprising:
  setting different laser parameters for different isolation layer regions so that refractive indexes of said isolation layer regions are same as determined refractive indexes and refractive indexes of different isolation layer regions are different.

30. The spatial encoding method according to claim 29, wherein said laser parameter is selected from a group consisting of a laser irradiation power, a laser irradiation time, a laser wavelength and a laser lattice density.

31. The spatial encoding method according to claim 21, wherein a shape of different isolation layer regions comprises a polygonal array or a circular array.

32. A spatial encoding device according to claim 17, which comprises:
  an encoding function determining unit for determining isolation layer regions to be encoded in the device and a spatial encoding function of said isolation layer regions;
  an encoding property determining unit for determining spatial encoding properties of said isolation layer regions so that different isolation layer regions are different in spatial encoding properties;

an encoding realization unit for changing the shapes and/or encoding properties of said isolation layer regions according to said spatial encoding function and said spatial encoding properties to complete spatial encoding of said device.

\* \* \* \* \*